March 8, 1932.   C. A. TEA   1,848,585
SNUBBER
Filed April 2, 1930

INVENTOR
CLARK A. TEA.
BY
*Irving Harness*
ATTORNEY

Patented Mar. 8, 1932

1,848,585

UNITED STATES PATENT OFFICE

CLARK A. TEA, OF DETROIT, MICHIGAN, ASSIGNOR TO CHRYSLER CORPORATION, OF DETROIT, MICHIGAN, A CORPORATION OF DELAWARE

SNUBBER

Application filed April 2, 1930. Serial No. 441,114.

This invention relates to snubbers of the type shown in my copending application Serial No. 409,404, filed November 23, 1929.

The main objects of this invention are to provide improved snubbers for vehicles which offer a low resistance to compression and rebound of the vehicle springs when the latter are substantially in their normal position so as to allow free and sensitive spring action when a vehicle is driven on smooth roads such as city streets; to provide a snubber of this kind which will also regulate the spring action effectively on rough roads; to provide a snubber which is adapted to resist downward movement of a vehicle body with a gradually increasing magnitude as the body departs further and further from its normal position, and to resist upward movement of the body with a gradually decreasing magnitude as the body is rebounded towards its normal position thereafter by the vehicle spring; and to provide a device of this kind which also builds up a gradually increasing resistance to movement of the body beyond its normal position by the rebounding action of the spring, and a decreasing resistance to the return of the body from its rebounded limit to its normal position.

Further objects of this invention are to provide a yieldable bearing for pivotally supporting a movable part independently of the other stationary structure of a snubber; to provide an improved cam construction in a device of this kind by which the frictional resistance of the bearing to rotation of the movable part is regulated during operation; and to provide means by which the frictional resistance characteristics of a device of this kind may be inexpensively predetermined so as to adapt snubbers of substantially the same general structure for use on vehicles of various weights.

An illustrative embodiment of this invention is shown in the accompanying drawings, in which.

Figure 1:
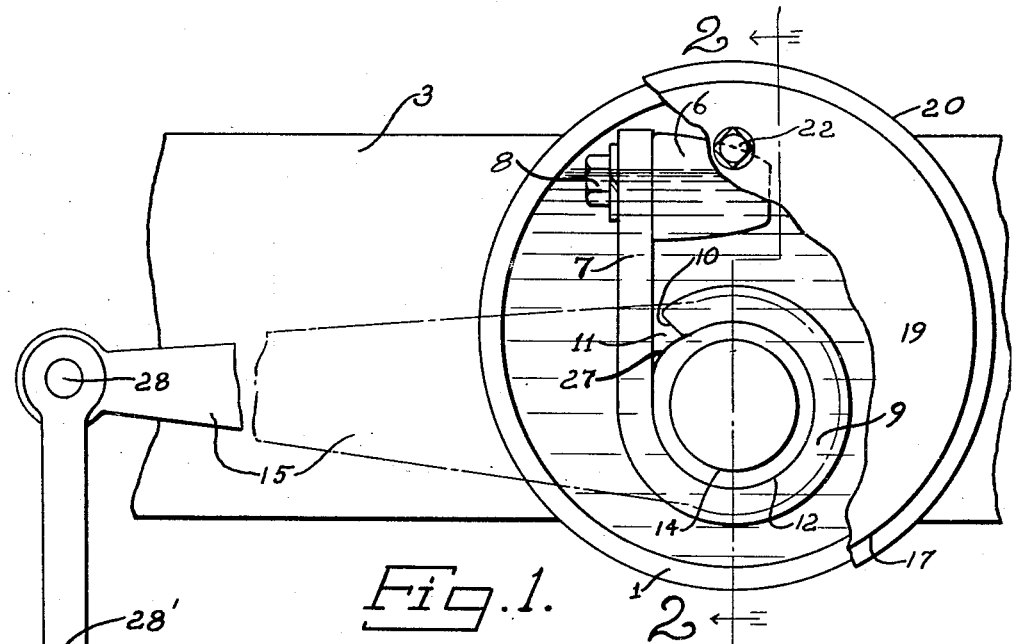
Fig. 1 is a side elevation of a snubber embodying my invention showing the casing thereof broken away and disclosing the underlying structure.

In the form shown, the improved snubber includes a disc shaped base 1 having a boss 2 thereon which is firmly clamped upon a channel bar 3 of a vehicle chassis frame in close proximity to an axle of a vehicle, not shown in the drawings, by a bolt 4 and a nut 5. Formed on the base part 1 is an integral arm 6 on which a support 7 is rigidly mounted by bolts 8.

Figure 2:
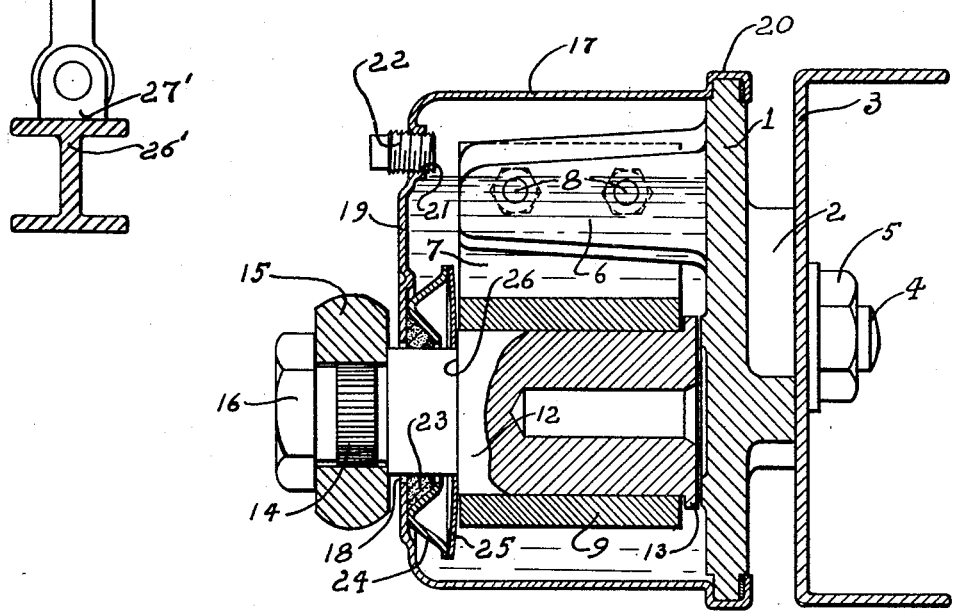
Fig. 2 is a vertical section taken on line 2—2 of Fig. 1.

The support 7 preferably comprises spring steel and has an open collar 9 on its lower end which is formed by an incomplete convolution of the end portion of the member 7. The extremity 10 of the convolution 9 approaches to within close proximity of the side of the support 7 providing a gap 11 in the collar. Journaled in the collar 9 is a shaft 12 having a radial flange 13 on its inner end which engages the inner end of the collar 9 as shown in Fig. 2. The outer end of the shaft 12 has a splined portion 14 on which a lever 15 is firmly held by a nut 16.

Mounted on the base part 1 is a sheet metal casing 17 having an aperture 18 in its end wall 19 for receiving the shaft 12. The casing 17 is substantially cup shaped and has a beaded portion 20 which is engaged over the edge portion of the disc shaped base 1. The interior of the casing may be filled with oil or grease through an opening 21 which is normally closed by a threaded plug 22. Provided on the shaft 12, around the opening 18, is a packing ring 23 which is firmly held against the shaft 12 and front wall 19 of the casing by metal rings 24 and 25 which bear against a shoulder 26 on the shaft 12.

Formed on the periphery of the shaft 12 is a cam 27 which is located in the gap 11 between the extremity 10 of the collar 9 and the side of the support 7. This cam is illustrated on an exaggerated scale in Fig. 1 and it is adapted to pass under the free portion of the collar 9 when the shaft 12 is rotated in a clockwise direction, and under the fixed portion of the collar when the shaft is rotated in a counterclockwise direction. The cam 27 expands the yieldable bearing member in which the shaft is journaled causing the grip of the bearing upon the shaft to be increased as the cam is rotated in either direction from its normal position. The cam 27 is moved from its normal position in the gap 11 and passes under the free end portion of the collar 9, thereby expanding the collar and increasing its grip upon the shaft. This action increases the frictional resistance of the collar to rotation of the shaft 12 and effectively retards the downward movement of the vehicle chassis.

In operation, the free end of the lever 15 having an aperture 28 is pivotally attached to a link 28′ which is journaled on a bracket 27″ secured to an axle 26′ and the base part 1 is rigidly mounted on the chassis frame of a vehicle as described above. When the vehicle chassis moves downwardly relative to its axles the springs upon which the chassis is supported are compressed and the lever 15, together with the shaft 12, are rotated in a clockwise direction as viewed in Fig. 1.

As the body is rebounded upwardly after compression of the springs, the shaft 12 is rotated in a counterclockwise direction and the frictional resistance to rotation of the shaft is gradually decreased until the cam 27 reaches its normal position. If the rebound is forceful enough to project the chassis above its normal position the shaft 12 is rotated further in a counterclockwise direction and the cam 27 is carried under the fixed end portion of the collar 9, thereby increasing the grip of the collar upon the shaft and retarding rotation of the latter. When the force of the upward rebound has been fully dissipated the chassis settles back to its normal position rotating the cam 27 into the gap 11. During this return downward movement of the chassis the cam 27 gradually decreases the frictional resistance of the collar to rotation of the shaft.

The length of the cam 27 is preferably somewhat less than the length of the gap 11 so as to allow the shaft 12 to rotate solely against the initial compression of the collar 9 within predetermined limits. This permits free and sensitive spring action when the vehicle is driven on smooth roads. The cam 27 becomes effective however when the vehicle is driven over rough roads where the springs are subjected to forceful compression.

Although but one specific embodiment of this invention has herein been shown and described, it will be understood that various changes including the size, shape and arrangement of parts may be made without departing from the spirit of my invention and it is not my intention to limit its scope other than by the terms of the appended claims.

I claim:

1. A snubber comprising a fixed yieldable bearing, a shaft mounted in said bearing and supported independently thereby, and means on said shaft for varying the frictional engagement of said shaft and bearing.

2. A snubber comprising a stationary support, a yieldable bearing fixed on said support having a passage in its inner periphery, a shaft journaled in said bearing and supported substantially independently by said bearing, and a cam surface on said shaft normally located in said passage for varying the frictional engagement of said bearing and shaft during rotation of the latter.

3. A snubber comprising a casing, a support in said casing, a yieldable bearing on said support, a shaft journaled in said bearing and supported thereby independently of the walls of said casing, and means on said shaft for gradually increasing the resistance of said bearing to rotation of said shaft during rotation of the latter.

4. A snubber comprising a casing, a shaft extending into said casing having an external lever, a support rigidly mounted on said casing comprising resilient material and having an incomplete convolution gripping said shaft for frictionally resisting rotation thereof, and a cam surface on the periphery of said shaft normally located in the gap of said incomplete convolution for gradually increasing the grip of said convolution upon said shaft as the latter is rotated from its normal position and gradually decreasing the grip upon said shaft as it is rotated towards its normal position.

5. A vehicle snubber comprising a casing adapted to be mounted on a chassis frame, a crank extending into said casing comprising a shaft and a crank arm, said arm being adapted for pivotal attachment to the axle of a vehicle, a bearing rigidly fixed in said casing comprising an incomplete convolution of resilient metal for gripping said shaft and forming the sole support thereof, and a cam on said shaft normally located in the gap of said incomplete convolution for gradually increasing the grip of said bearing upon said shaft during rotation of the latter from its normal position.

6. A snubber comprising a casing having an aperture in one end, a support in said casing, a stationary longitudinally open collar on said support substantially concentric with the end aperture of said casing, a shaft extending into said casing through said aperture, journaled in said collar and held thereby in spaced relation to the sides of said aperture, and a cam on said shaft normally located in the gap of said open collar for expanding the latter to increase its frictional resistance to rotation of said shaft as the latter is rotated from its normal position.

7. A snubber comprising a casing having an aperture in one end, a support in said casing, a yieldable bearing fixed on said support substantially concentric with said aperture, a shaft journaled in said bearing and held thereby against engagement with the sides of said aperture, and means on said shaft for gradually increasing the resistance thereof to rotation of said shaft as the latter is rotated from a predetermined position.

8. A snubber comprising a casing having an aperture in one end, a support in said casing, a yieldable bearing fixed on said support substantially concentric with said aperture, a shaft journaled in said bearing and held thereby against engagement with the sides of said aperture, and means on said shaft for gradually increasing the resistance thereof to rotation of said shaft as the latter is rotated from a predetermined position, said means being adapted to gradually decrease said resistance as said shaft is returned to said predetermined position.

9. A snubber comprising a bracket adapted to be attached to a chassis frame, a stationary support rigidly mounted on said bracket comprising spring metal and having an open loop at one end, and an oscillating arm pivotally mounted on said support having a shaft journaled in said eye, said shaft having a greater radius normally at the open side of said loop than at the remaining parts thereof for regulating the grip of said loop upon said shaft when the latter is rotated from its normal position.

10. In combination with a vehicle chassis, a stationary bracket rigidly mounted on the frame of said chassis, a support secured to said bracket having an open loop at one end, a shaft journaled in said loop, an arm on said shaft, and a link pivotally connecting said arm with the axle of said chassis, said shaft having a greater radius normally at the open side of said loop than at the closed sides thereof for varying the frictional resistance of said loop to relative movement of said frame and axle.

11. In combination with a vehicle chassis, a stationary support secured to the frame of said chassis having a yieldable open loop at one end, a shaft journaled in said loop, said loop having an initial grip on said shaft, an arm on said shaft, a link pivotally connecting said arm with an axle of said vehicle, and a cam surface on said shaft normally located in the open side of said loop for augmenting the initial grip of said loop upon said shaft, the width of said cam being substantially less than the width of said open side for allowing rotation of said shaft against the initial compression of said loop within predetermined limits.

12. A snubber comprising a stationary support, a stationary yieldable bearing secured to said support and having a passage therein, a shaft supported independently by said bearing, said bearing being under an initial compression for frictionally retarding rotation of said shaft, and a cam on said shaft normally located in said passage for varying the frictional relation of said shaft and bearing, said cam being narrower than said passage for permitting limited rotation of said shaft against the initial compression of said bearing.

13. In combination with a vehicle including a chassis frame and a resiliently supported axle, a crank member having an arm pivotally connected with said axle and including a shaft portion, a member rigidly mounted on said chassis frame including a resilient element having an incomplete convolution surrounding and gripping said shaft for frictionally resisting rotation thereof, and a cam surface on the periphery of said shaft normally located in the gap of said incomplete convolution for gradually increasing the grip of said convolution upon said shaft as the latter is rotated from its normal position and gradually decreasing the grip upon said shaft as it is rotated towards its normal position.

14. In combination with a vehicle including a chassis frame and a resiliently supported axle, a crank member having an arm pivotally connected with said axle and including a shaft portion, a prehensile bearing rigidly mounted on said chassis frame having a discontinuous inner periphery gripping said shaft portion for frictionally resisting rotation thereof, and a cam surface on the periphery of said shaft normally located between spaced portion of the discontinuous inner periphery of said bearing.

15. A snubber including a rotatable element, a fixed prehensile bearing having a discontinuous inner periphery surrounding said rotatable element for frictionally resisting all stages of rotation of said element with respect to said bearing, and protruding means on said rotatable element normally located between adjacent portions of the discontinuous inner periphery of said bearing for varying the frictional characteristics of said snubber during rotation of said element.

CLARK A. TEA.